(12) United States Patent
Qiao et al.

(10) Patent No.: US 10,434,551 B1
(45) Date of Patent: Oct. 8, 2019

(54) METHOD FOR IMPROVING SALINE-ALKALINE SOIL BY USING BIOMASS RAPID PYROLYSIS PRODUCT

(71) Applicant: China University of Petroleum (East China), Qingdao (CN)

(72) Inventors: Yingyun Qiao, Qingdao (CN); Yuanyu Tian, Qingdao (CN); Kechang Xie, Qingdao (CN); Zhaohe Yang, Qingdao (CN); Meng Yuan, Qingdao (CN); Yanpeng Zhang, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 0 days.

(21) Appl. No.: 16/293,139

(22) Filed: Mar. 5, 2019

(30) Foreign Application Priority Data

Dec. 10, 2018 (CN) .......................... 2018 1 1501210

(51) Int. Cl.

| | |
|---|---|
| *B09C 1/08* | (2006.01) |
| *C05F 11/08* | (2006.01) |
| *C05C 9/00* | (2006.01) |
| *C05B 7/00* | (2006.01) |
| *C05D 1/00* | (2006.01) |
| *C05D 1/02* | (2006.01) |
| *C05B 17/00* | (2006.01) |
| *B09C 1/02* | (2006.01) |
| *B09C 1/06* | (2006.01) |
| *C10B 53/02* | (2006.01) |

(52) U.S. Cl.
CPC .................. *B09C 1/08* (2013.01); *B09C 1/02* (2013.01); *B09C 1/065* (2013.01); *C05B 7/00* (2013.01); *C05B 17/00* (2013.01); *C05C 9/00* (2013.01); *C05D 1/00* (2013.01); *C05D 1/02* (2013.01); *C05F 11/08* (2013.01); *C10B 53/02* (2013.01)

(58) Field of Classification Search
None
See application file for complete search history.

(56) References Cited

U.S. PATENT DOCUMENTS

| | | | | |
|---|---|---|---|---|
| 5,676,727 A | * | 10/1997 | Radlein ..................... | C05C 3/00 71/11 |
| 8,361,186 B1 | * | 1/2013 | Shearer ..................... | C05F 5/00 71/32 |
| 9,725,371 B2 | * | 8/2017 | Shearer ..................... | C05D 9/02 |
| 10,173,937 B2 | * | 1/2019 | Belcher ..................... | C05F 11/02 |
| 2009/0126433 A1 | * | 5/2009 | Piskorz ..................... | C05D 9/00 71/25 |
| 2014/0345341 A1 | * | 11/2014 | Fiato ..................... | C05B 17/00 71/7 |

FOREIGN PATENT DOCUMENTS

| | | | | | |
|---|---|---|---|---|---|
| CN | 106187506 A | * | 12/2016 | ............... | C05G 3/00 |
| CN | 106866265 A | * | 6/2017 | ............... | C05G 3/00 |
| CN | 106957656 A | * | 7/2017 | ............... | C05G 3/00 |

* cited by examiner

*Primary Examiner* — Wayne A Langel
(74) *Attorney, Agent, or Firm* — Volpe and Koenig, P.C.

(57) ABSTRACT

Providing a method for improving saline-alkaline soil by using a biomass rapid pyrolysis product, comprising: rapidly pyrolyzing agricultural and forest residues to prepare bio-oil and semi-coke; deodorizing, dephenolizing and tackifying the bio-oil to prepare a modified bio-oil, and supplementing the modified bio-oil with the nutrient elements to produce a rapid ameliorant for saline-alkali soil; loading microbial fertilizer on the semi-coke to prepare a continuous renovation ameliorant for saline-alkali soil; (4) applying the ameliorants on the surface of saline-alkali soil. The method can not only enhance the aggregated and granulated structure of the saline-alkali soil and eliminate the salt carried by the capillary water, but also convert the mineral resource-based calcium, magnesium and ferrite salts which are insoluble and hardly absorbed into the humic acid calcium, magnesium and ferrite salts which can be easily absorbed, thereby activate calcium, magnesium and iron elements, strengthen soil fertility, rapidly renovate soil and restore the plantation function.

5 Claims, No Drawings

METHOD FOR IMPROVING SALINE-ALKALINE SOIL BY USING BIOMASS RAPID PYROLYSIS PRODUCT

CROSS REFERENCE TO RELATED APPLICATIONS

This application claims priority to Chinese Application No. 201811501210.3, filed on Dec. 10, 2018, entitled "Method for Preparing Three-Dimensional Improvement and Treatment Product System for Saline-Alkaline Soil Using Biomass Rapid Pyrolysis Product", which is specifically and entirely incorporated by reference.

FIELD OF THE INVENTION

The invention relates to purification and treatment of degraded soil, particularly relates to a method for improving saline-alkaline soil by using biomass rapid pyrolysis product.

BACKGROUND OF THE INVENTION

According to the incomplete statistics from United Nations Educational, Scientific, and Cultural Organization (UNESCO) and Food and Agricultural Organization (FAO), the total area of saline-alkaline land in the world is 954.38 million hectares, of which 99.13 million hectares are located in the People's Republic of China (PRC). The formation of alkaline soil and alkalized soil in China is mostly associated with the accumulation of carbonate in the soil, thus the degree of alkalization is generally high, and the plants can hardly survive in the area with severely salinized and alkalized soil.

A variety of saline-alkaline soils are formed under certain natural conditions, and the essence of the soil formation is mainly the redistribution of various soluble salts on the ground in the horizontal and the vertical direction, so that the salt content is gradually accumulated in the soil surface of the salt-collecting area. The root cause of the formation of saline-alkali soil is poor water condition, thus in the early stage of soil improvement, the efforts should be focused on improving the moisture condition of soil. At present, the treatment of saline-alkali soil is generally implemented in several steps, firstly draining and washing salt in order to reduce salt content in the soil; then growing plants resistant to salt and alkali so as to fertilize the soil; and finally planting crops. The specific improvement measures comprise: drainage, irrigation for washing salt, colmation and modification, planting paddy, improving fertility and modifying the soil, leveling land, and improving soil with chemicals. Such a method has a desirable effect on the treatment of land with low to moderate salinization and alkalization, but the treatment needs a long period and high cost, and there is a rebound phenomenon of salinization and alkalization. In addition, the method is not applicable to the secondary saline-alkali land caused by improper farming management, the coastal saline-alkali land formed by seawater impregnation, and the treatment of grassland saline land, which are also the bottleneck and difficulty in the treatment of salinized and alkalized soil treatment.

Humic acid is a kind of macromolecular and organic mixture with weak acidity formed with remains of plants and animals following the decomposition and transformation of microorganisms and a series of geophysical and chemical processes, it maintains the natural state and biological activity of various structural components and its rich functional groups, such as aromatic rings, conjugated double bonds, hydroxyl groups, carboxyl groups, phenolic hydroxyl groups, carbonyl groups and the like, it allows the soil to be easily agglomerated and granulated. The humic acid may be used for conditioning, treating and renovating soil in view of soil structure, enhancing the degree of soil agglomeration, reducing the ascending speed and height of capillary water, preventing the capillary water from carrying salt content to the ground surface, avoiding a formation of saltmarsh due to moisture drain and salt retention, it is the current research hotspot of rapid and permanent renovation of degraded saline-alkali soils.

However, mineral resource-based humic acid is at now the primary source of humic acid products. Due to the raw material has low content of active ingredients, the solidified active functional groups need to be activated and purified, the process consumes a lot of alkali and acid and is accompanied with a large amount of high-concentration organic wastewater, the production cost is high. How to produce high-activity liquid humic acid at low cost is the key factor and difficult problem for rapid and permanent restoration of saline-alkali land with humic acid.

SUMMARY OF THE INVENTION

The purpose of the present invention is to provide a method for improving saline-alkaline soil by using biomass rapid pyrolysis product in order to overcome the disadvantages of the existing saline-alkaline soil remediation technology, the method can not only enhance the granular structure of the saline-alkali soil and eliminate the salt carried by the capillary water, but also activate calcium, magnesium and iron elements, strengthen soil fertility, rapidly renovate soil and restore the plantation function. In addition, the invention combines rapid renovation with continuous slow renovation, thereby achieves a permanent, sustainable and environmental-friendly in-situ remediation of soil without secondary pollution.

The inventors of the present invention discover in research that the pyrolysis bio-oil has an oxygen content of more than 40% with high acidity and viscosity, its calorific value is only one half of the petroleum fuel. Under a current circumstance that the international crude oil price is dropping dramatically, the pyrolysis bio-oil does not have a competitive advantage when it is used as the fuel oil; however, the pyrolysis bio-oil is abundant with active functional groups such as carboxyl, phenolic group, ketone groups, phenolic hydroxyl groups, and can be applied as a raw material for preparing a rapid ameliorant for saline-alkali soil. The biomass rapid pyrolysis semi-coke is black porous solid granule, it is cheap and contains a small amount of bio-oil, and may be used as a high-quality carrier for microbial fertilizer. It can be mixed into the soil to increase the soil temperature, conserve soil moisture and preserve the fertilizers. It has the potential for producing the saline-alkali soil ameliorant.

Based on the above discovery, the present invention provides a method for improving saline-alkaline soil by using a biomass rapid pyrolysis product, the method comprising:

(1) rapidly pyrolyzing agricultural and forest residues to prepare bio-oil and semi-coke, and pulverizing the semi-coke to obtain semi-coke powder; wherein the agricultural and forest residues may be straw, such as corn stalk; wherein the agricultural and forest residues may be clean agricultural and forest residues, that is agricultural and forest residues has not been contaminated by heavy metals and organic pollutants;

(2) deodorizing, dephenolizing and tackifying the bio-oil to prepare a modified bio-oil, and supplementing the modified bio-oil with the nutrient elements of crops to produce a rapid ameliorant for saline-alkali soil;

(3) loading microbial fertilizer on the semi-coke powder to prepare a continuous renovation ameliorant for saline-alkali soil;

(4) uniformly applying 0.2-0.5 kg of the rapid ameliorant for saline-alkali soil and 0.03-0.45 kg of the continuous renovation ameliorant for saline-alkali soil respectively on surface of saline-alkali land per square meter, pulverizing and mixing the ameliorants with saline-alkali soil existing in the surface of saline-alkali land in a depth of 100-300 mm with a rotary cultivator, in order to form a water-stable granular structure with a particle diameter larger than 0.25 mm, thereby performing continuous and three-dimensional renovation and improvement of the saline-alkali soil.

Preferably, the rapid ameliorant for saline-alkali soil obtained in the step (2) comprises: water 10-30 wt. %, bio-oil 50-80 wt. %, emulsifier 0.1-2 wt. %, urea 3-8 wt. %, potassium fertilizer 0-6 wt. %, phosphate fertilizer 0-8 wt %;

wherein a method for preparing the rapid ameliorant for saline-alkali soil comprising:

adding bio-oil into a reaction kettle and heating it to 50-95° C. (may heating with steam or heat-conducting oil);

adding urea to react for 15-80 minutes under stirring at a rotate speed of 20-200 rpm so as to deodorize, dephenolize and increase viscosity (urea-formaldehyde resin, phenolic resin, and other substances may be produced);

then adding emulsifier, potassium fertilizer and phosphate fertilizer and stirring evenly, further adding water, and then stirring and emulsifying to form a uniform mixed liquid;

separating insoluble substance from the mixed liquid with a centrifugal filter to obtain filtered reaction liquid used as the rapid ameliorant for saline-alkali soil. Wherein the stirring and emulsifying process is an intensive agitation for 10-30 minutes.

Preferably, the intensive agitation can be accomplished by equipments of a vigorously stirring and emulsifying apparatus, such as a colloid mill or a strong shear emulsifying machine.

Preferably, the reaction kettle is a stainless steel reaction kettle or a glass-lined reaction kettle.

The emulsifier is one or more of an anionic surfactant, a cationic surfactant, and an amphoteric surfactant.

The potassium fertilizer is one or more of potassium sulfate, potassium chloride, potassium carbonate and potassium hydrogencarbonate.

The phosphate fertilizer is one or more of diammonium phosphate, potassium hydrogen phosphate, potassium phosphate and ammonium perphosphate.

Preferably, the method of preparing continuous renovation ameliorant for saline-alkali soil comprising:

(1) mixing 0.1 to 2 parts by weight of a humectant with 100 parts by weight of the semi-coke powder uniformly to prepare a modified semi-coke powder; wherein the humectant may be formulated into a solution and then be mixed with the semi-coke powder, preferably, wherein the semi-coke powder has a particle diameter of 0.01-5 mm;

(2) with respect to 100 parts by weight of the semi-coke powder, loading 3-20 parts by weight of the microbial fertilizer uniformly on the modified semi-coke powder and drying; the drying process is preferably the low-temperature drying, for example, at the temperature of 10-50° C., or dry naturally, wherein the humectant is an anionic surfactant, a nonionic surfactant, and a silanol nonionic surfactant, and a solvent which has a small surface tension and is miscible with water; the solvent which has a small surface tension and is miscible with water includes one or more selected from the group consisting of ethanol, propylene glycol, glycerin and dimethyl sulfoxide;

wherein the microbial fertilizer comprises microbial thallus or microbial metabolites, the microbial thallus is at least one of Bacillus, Saccharomyces cerevisiae, Aspergillus oryzae, Rhizobium, Azotobacteria and Phosphorus bacteria; the metabolite is an active enzyme, which is one or more of a protease and a plant kinase.

Preferably, a method for rapidly pyrolyzing agricultural and forest residues comprising: pyrolyzing the agricultural and forest residues in the reaction conditions of absence of air at 490-600° C. for 0.1-20 s.

The methods are implemented and tested according to the above scheme, it is demonstrated that the method of the invention is reasonable, the operation is simple and safe, the production cost is low, the salinized and alkalized soil can be permanently and effectively renovated, thereby achieve the effects of enhancing the granular structure of the saline-alkali soil, eliminating the salt carried by the capillary water, reinforcing the effects of rainfall or irrigation and leaching; it can also convert the mineral resource including based calcium, magnesium and ferrite salts which are insoluble and hardly absorbed into the humic acid calcium, magnesium and ferrite salts which can be easily absorbed, thereby activate calcium, magnesium and iron elements, increase ground temperature, and reduce soil bulk density by more than 20%; strengthen soil fertility, eradicate secondary pollution, improve the natural environment, renovate the soil rapidly, continuously and effectively. The renovated soil can be used for growing a variety of crops, trees and flowers, the treatment cost is low, and the method may be applied in a wide range and produce improved economic and social benefits, thereby fulfill the predetermined purpose desirably.

DETAILED DESCRIPTION OF THE EMBODIMENTS

The features of invention will be described in detail with reference to the examples.

Example 1

(1) 2,400 kg of clean corn straws which have not been contaminated by harmful heavy metals and organic pollutants are pulverized into particles with an equivalent diameter of 6 mm or less, and then passing the particles through the descending circulating fluidized bed under the condition of absence of ai, 500 ms to rapidly pyrolyze the particles for 10 s to prepare bio-oil and semi-coke, the semi-coke is pulverized to prepare a semi-coke powder with a particle diameter of 0.01-5 mm.

(2) Adding 1,200 kg of bio-oil to a stainless steel reaction kettle, heating it with steam to a temperature of 85° C., subsequently adding 120 kg of urea, stirring the mixture at the rotate speed of 60 rpm and reacting for 30 minutes, then adding 5 kg of emulsifier (nascent soap, $CH_3(CH_2)_7-CH=CH-(CH_2)_7COONa$), 60 kg of potassium sulfate and 120 kg of diammonium phosphate and stirring evenly; further adding 495 kg of water and stirring, using a colloid mill to partially circulating and emulsifying so as to form a uniform mixed liquid; then separating the mixed liquid with a centrifugal filter and remove the insoluble substance, the filtered reaction liquid is exactly a rapid ameliorant for saline-alkali soil.

(3) with respect to 100 parts by weight of the semi-coke powder, 0.5 parts by weight of the silanol nonionic surfactant GSK-588 is formulated into a 2 wt. % aqueous solution, which is uniformly mixed with the semi-coke powder to prepare a modified semi-coke powder. The modified semi-coke powder is further blended evenly with the microbial bacterial fertilizer solution containing 5 parts by weight of *Bacillus, Rhizobium, Azotobacteria* and *Phosphorus* bacteria, and the microbial fertilizer solution is loaded on the modified biological semi-coke powder, and performing a low-temperature drying under a temperature of 45° C., thereby prepare a continuous renovation ameliorant for saline-alkali soil.

(4) uniformly applying 200 kg of rapid ameliorant for saline-alkali soil and 50 kg of continuous renovation ameliorant for saline-alkali soil respectively on the surface of saline-alkali land with an area of 667 m$^2$, pulverizing and mixing the ameliorants and the saline-alkali soil on land surface having a depth of 200 mm with a rotary cultivator, so as to form a water-stable granular structure with a particle diameter larger than 0.25 mm through measurement performed with the water-stable granular structure test method. The paddy is planted in the same year, seedlings emerge orderly and the seedlings are strong, the yield per mu (roughly equivalent with 667 m$^2$) in the actual measurement is 695 kg, increasing production by more than 90%.

In the heavily salinized and alkalized land in the Hetao area of Inner Mongolia Autonomous Region of China, per mu of land is sprinkled with 100 kg of rapid ameliorant for saline-alkali soil prepared from pyrolysis bio-oil and 60 kg of continuous renovation ameliorant for saline-alkali soil, the ameliorants are blended with saline-alkali soil in land surface having a depth of 200 mm by a rotary cultivator. Water-stable granular structures with a particle diameter larger than 0.25 mm are formed through measurement performed with the water-stable granular structure test method. Following sprinkling irrigation process, corn is planted, seedlings emerge orderly and the seedlings are strong, the yield per mu (roughly equivalent with 667 m$^2$) in the actual measurement is 540 kg, increasing production by more than 40%.

Example 2

The improvement of the saline-alkali soil is carried out in accordance with the method of Example 1, the difference resides in that the urea is added along with other substances in the preparation process of the rapid ameliorant for saline-alkali soil. In step (4), the yield per mu of rice is 625 kg, increasing production by 80%, and the yield per mu of corn is 520 kg, increasing production by 34%.

Example 3

The improvement of the saline-alkali soil is carried out in accordance with the method of Example 1, the difference resides in that the wetting agent is replaced with an equal amount of water during the preparation process of the continuous renovation ameliorant for saline-alkali soil. In step (4), the yield per mu of rice is 560 kg, increasing production by 62%, and the yield per mu of corn is 500 kg, increasing production by 30%.

Comparative Example 1

The improvement of the saline-alkaline soil is carried out according to the method of Example 1, the difference resides in that the rapid ameliorant for saline-alkali soil is replaced with an equal amount of sodium humate. In step (4), the yield per mu of rice is 460 kg, increasing production by 33%, and the yield per mu of corn is 450 kg, increasing production by 17%.

The invention claimed is:

1. A method for improving saline-alkaline soil by using a biomass rapid pyrolysis product, comprising:
    (1) rapidly pyrolyzing agricultural and forest residues to prepare bio-oil and semi-coke, and pulverizing the semi-coke to obtain semi-coke powder;
    (2) deodorizing, dephenolizing and tackifying the bio-oil to prepare a modified bio-oil, and supplementing the modified bio-oil with nutrient elements to produce a rapid ameliorant for saline-alkali soil,
    (3) loading microbial fertilizer on the semi-coke powder to prepare a continuous renovation ameliorant for saline-alkali soil,
    wherein the step of loading microbial fertilizer on the semi-coke powder comprises (a) mixing 0.1 to 2 parts by weight of a humectant with 100 parts by weight of the semi-coke powder uniformly to prepare a modified semi-coke powder, and (b) with respect to 100 parts by weight of the semi-coke powder, loading 3-20 parts by weight of the microbial fertilizer uniformly on the modified semi-coke powder and drying,
    wherein the humectant is an anionic surfactant, a nonionic surfactant, a silanol nonionic surfactant, and a solvent, which is miscible with water and includes one or more substance selected from the group consisting of ethanol, propylene glycol, glycerin and dimethyl sulfoxide, and wherein the microbial fertilizer comprises microbial thallus or microbial metabolites, the microbial thallus is at least one organism selected from the group consisting of *Bacillus, Saccharomyces cerevisiae, Aspergillus oryzae, Rhizobium, Azotobacteria* and *Phosphorus* bacteria, and the metabolite is an active enzyme, which is one or more enzyme selected from the group consisting of a protease and a plant kinase; and
    (4) uniformly applying 0.2-0.5 kg of the rapid ameliorant for saline-alkali soil and 0.03-0.45 kg of the continuous renovation ameliorant for saline-alkali soil respectively on surface of saline-alkali land per square meter, pulverizing and mixing the ameliorants with saline-alkali soil existing in the surface of saline-alkali land in a depth of 100-300 mm with a rotary cultivator, in order to form a water-stable granular structure with a particle diameter larger than 0.25 mm, thereby performing continuous and three-dimensional renovation and improvement of the saline-alkali soil.

2. The method according to claim 1, wherein the rapid ameliorant for saline-alkali soil obtained in the step (2) comprises: water 10-30 wt. %, bio-oil 50-80 wt. %, emulsifier 0.1-2 wt. %, urea 3-8 wt. %, potassium fertilizer 0-6 wt. %, phosphate fertilizer 0-8 wt %;
    wherein the step to produce the rapid ameliorant for saline-alkali soil comprises:
        adding the bio-oil into a reaction kettle and heating it to 50-95° C.;

adding urea to react for 15-80 minutes under stirring at a rotate speed of 20-200 rpm so as to deodorize, dephenolize and increase viscosity;

then adding emulsifier, potassium fertilizer and phosphate fertilizer and stirring evenly, further adding water, and then stirring and emulsifying to form a uniform mixed liquid;

separating insoluble substance from the mixed liquid with a centrifugal filter to obtain filtered reaction liquid used as the rapid ameliorant for saline-alkali soil.

3. The method according to claim 2, wherein the reaction kettle is a stainless steel reaction kettle or a glass-lined reaction kettle;

apparatus for stirring and emulsifying is a colloid mill or a shear emulsifying machine;

the emulsifier is one or more surfactant selected from the group consisting of an anionic surfactant, a cationic surfactant, and an amphoteric surfactant;

the potassium fertilizer is one or more potassium salt selected from the group consisting of potassium sulfate, potassium chloride, potassium carbonate and potassium hydrogencarbonate;

the phosphate fertilizer is one or more phosphate selected from the group consisting of diammonium phosphate, potassium hydrogen phosphate, potassium phosphate and ammonium perphosphate.

4. The method according to claim 1, wherein the step of rapidly pyrolyzing agricultural and forest residues comprises pyrolyzing the agricultural and forest residues in reaction conditions of absence of air at 490-600° C. for 0.1-20 s.

5. The method according to claim 1, wherein the semi-coke powder has a particle diameter of 0.01-5 mm.

* * * * *